Patented Sept. 28, 1954

2,690,558

UNITED STATES PATENT OFFICE 2,690,558

RADIO NAVIGATION SYSTEM

Norman L. Harvey, Buffalo, N. Y., assignor to Sylvania Electric Products Inc., a corporation of Massachusetts Application February 4, 1950, Serial No. 142,483

40 Claims. (Cl. 343—104)

This invention relates to radio navigation systems, including apparatus and methods.

In the prior art many radio aids to direction-finding and range-finding have been devised, by means of which a vehicle such as a vessel or aircraft can be located from an observation point or by means of which the course or the position of the vehicle can be found from on board.

Many of the prior art radio navigation systems have been concerned with directional radio beams either from a single antenna or an array of antenna. The directional properties of such radio beams are determined fundamentally by the overall size and spacing of the antennas or antenna arrays in terms of wavelengths of the frequencies being radiated. Practical considerations have necessitated operating such systems at quasi-optical radio frequencies, transmissions that follow optical paths. Long range radio navigation and radio location systems, however, require operation substantially beyond line-of-sight or optical path ranges, necessitating the use of frequencies that are low enough so that a substantial portion of the radiated waves will follow the curvature of the earth's surface.

In certain other known navigation and radio location systems, other techniques involving the measurement of a phase or time difference of transmissions over two paths have made unnecessary the use of directional beams and hence permit operation at low frequencies. One group of such systems employing substantially continuous wave transmissions, performs this measurement by comparing the phase relationship of the waves propagated over these two paths. In any practical application of such a system, however, the distances involved are usually equal to many wavelengths of the transmitted signal and a multiple position ambiguity exists. Furthermore, no distinction can be made between signals propagated over the most direct radio path and those signals propagated by other paths such as result from ionospheric or other reflections. Other systems of this same general type have endeavored to overcome these objections by the use of pulse or other modulations on the transmitted signals at the expense, however, of requiring higher peak power transmitting equipment for receivers of reduced sensitivity and of wider noise bandwidths, and inefficient use of the power radiated because of fundamental limitations in practical system components.

The present invention possesses several features for realizing the desired objectives of long range operation and/or discrimination against multi-path transmissions and other interfering signals without sacrificing the sensitivity of the receiving equipment, and permitting the use of restricted noise bandwidths in the receiving equipment and good efficiency in terms of the radiated power. Furthermore, the ambiguity existing in continuous wave systems can be completely resolved. The features of this invention are also adaptable to good advantage for operation at higher frequencies where shorter ranges are required but where discrimination against interfering signals is necessary. Several embodiments are capable, moreover, of providing a navigation and location system possessing unusual accuracy.

One embodiment of the invention to be described utilizes at least two signals emanating from points that are spaced apart for ascertaining or establishing the course or the range of a vehicle, and both of the signals are angle-modulated with the same wave-form although one may be delayed in time relative to the other. In this embodiment the two signals are of different mean frequency so as to be in separate channels; but they are converted, still at different mean frequencies, in such manner as to have the same deviation. These signals are mixed and their difference-frequency output is applied to a highly selective filter, conveniently in a beat-frequency amplifier. Examination of the frequency-time characteristics of the two signals at the comparison frequencies reveals that if the modulation envelopes of the duplicate signals having equal deviation are exactly in phase, then the difference-frequency will be an unvarying intermediate frequency having a value equal to the difference between the center frequencies of the two signals being compared. This identity of phase is established at a known "on course" point by means of suitable adjustable delay circuits either in the signal sources or in one of the input channels of the receiver. Thereafter, during navigation, the strength of the center frequency in the mixer output is to remain at a maximum.

The two signal sources or beacons are locked together as master and slave at points that are spaced apart in this embodiment of the invention. A geographic pattern of hyperbolic paths will be produced where critical response is obtained, paths which become roughly radial with respect to the center point between the beacons at great distances. A fixed difference in the time delay of signal transmission from the two beacons as determined by adjustment of the delay devices in the system establishes each hyperbolic path along which critical response is obtained. It is possible to shift an established hyperbolic course by adjusting a single delay circuit in the receiver and without changing either transmitted signal, and the change can be arranged to be either sudden or gradual. Large numbers of aircraft, traveling different courses, can thus utilize the same radio beacons.

As a further extension of the foregoing, it is possible to obtain a geographical fix through the use of an additional pair of signal sources which will provide a second hyperbolic path or family of paths that intersect the path or paths established by the first pair of sources. The second pair of sources can be entirely independent of the first pair of sources, or the two pairs of signal sources may utilize one signal source in common for a total of three.

In another form of the invention, the range is indicated by the comparison of two properly related angle-modulated signals, in place of the hyperbolic line indication of the system employing master and slave signal sources. In the illustrative form of the invention that yields range data, one of the angle-modulated signals comes from a highly stable signal generator located at a fixed point, whereas the second is separately generated by a highly stable source to be of a different frequency but of duplicate modulation. The latter is carried by the vehicle, and as the distance separating the vehicle from the stationary beacon changes, the relative phase of the signals changes. The change of this phase relationship is a measure of the range.

A third form of the invention, incorporating features of each of the two embodiments outlined above, is also disclosed. The nature of this invention, and further features of novelty, will be more fully appreciated from the following detailed disclosure. Referring now to the accompanying drawings in which several forms of the invention are shown, Fig. 1 is a diagrammatic view of an illustrative hyperbolic navigation system;

Fig. 2 is a frequency-time diagram showing the relative frequencies and relative timing of the modulation at different points in the navigation system of Fig. 1;

Figs. 3a-c are diagrams representing different operating conditions in the system of Fig. 1 that are possible at different ranges;

Figure 1:
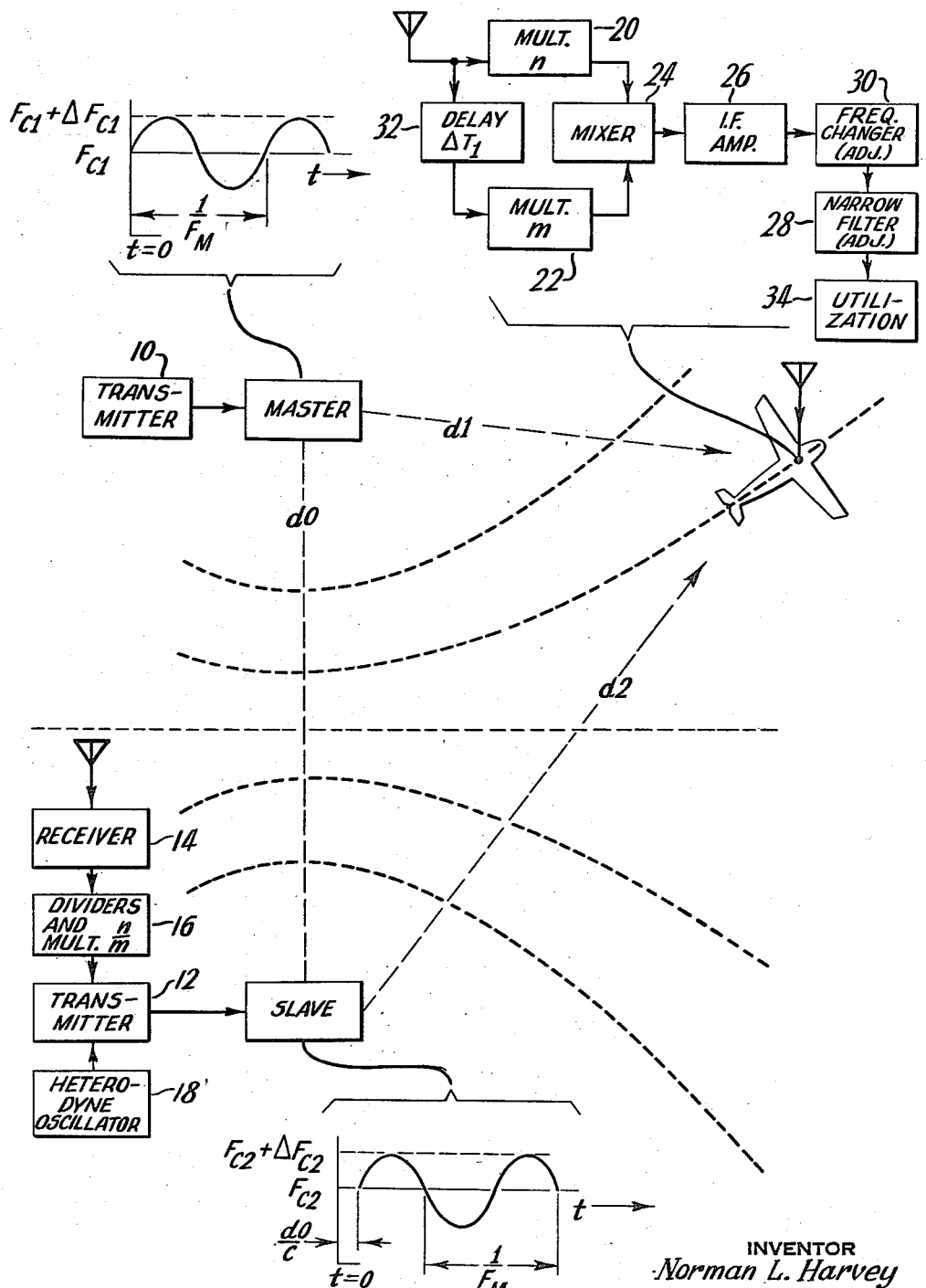

In Fig. 1 a number of dotted lines are shown between master and slave transmitters that are separated along a base line by a distance $d_0$. These lines are substantially hyperbolic, but for distances great in comparison to the base line the lines become substantially radial with respect to the mid-point between the transmitters. Each hyperbolic path lies along a line of fixed phase relationship between angle-modulated signals having duplicate modulation envelopes from the master and slave transmitters.

The illustrative system of Fig. 1 includes a transmitter 10 which may be of any suitable design for radiating an angle-modulated carrier. For simplicity, sine-wave frequency modulation will be considered, but it is significant that other forms of modulation are within the purview of the invention and under special circumstances other wave-forms of modulation may be preferred. At the slave station a transmitter 12 is situated for radiating a signal of different carrier frequency from that of the master but of the same modulation wave-form. In the present instance the signal transmitted is that derived by receiver 14 feeding through a suitable frequency changer 16 to produce a signal that is heterodyned in unit 12 by an unmodulated signal from heterodyned oscillator 18. Unit 16 multiplies the frequency of the signal from the master transmitter by a factor $n/m$, $m$ and $n$ being any numbers (conveniently low-order integers) that may be used as multipliers in the receiver described below and the heterodyne conversion introduces a shift or fixed change in frequency.

In the vehicle there is a receiver having a first channel including a circuit 20 for multiplying the signal from the master by the factor $n$ and a second channel including a circuit 22 for separately receiving the slave signal and multiplying it by a factor $m$. The multiplication factors $m$ and $n$ are so related to the mean frequencies of the transmitters and of the intermediate frequency amplifier at the output of the mixer in the vehicle receiver, that when the input signals to mixer 24 are heterodyned with each other, the center frequency of the resulting difference-frequency signal will be transmitted through I.-F. amplifier 26. The center-frequency component of this signal is transmitted through sharp filter 28 after an increase in frequency by unit 30. The Q of sharp or narrow band-pass filter 28 should be high enough to reduce the nearest sideband components to an inconsequential level, that is, the effective bandwidth should be limited to twice the modulation frequency $F_M$. The frequency of oscillator 18 in the slave transmitter is related to that to which I.-F. amplifier 26 is tuned by the factor $1/m$.

An adjustable delay unit 32 in one of the input channels (as that including multiplier 22 in the receiver in this instance) is provided to compensate for system delays and for selecting any desired hyperbolic course. One of the transmitted signals will usually be delayed in relation to the other, because of the various circuit and transmission delays, including $d_0/c$, the time of transmission from the master to the slave transmitter. This delay unit so shifts the signal impressed on it that when the receiver is on the selected course, the output of both receiver channels will be in phase as to modulation cycles and a certain relationship will exist between the carrier cycles, as will become apparent.

The operation of the system may be visualized by an analogy. If the master transmitter were to send a signal of unvarying frequency and if the slave were to send a fixed-frequency signal higher or lower than that of the master differing by a frequency properly related to that for which the sharp filter 28 is designed, then a strong signal would constantly reach utilization device 34 such as an indicator. If the frequency of only the master were varied cylically, then only at moments would there be any output from filter 28, most of the signal energy being in the higher and lower sidebands. Finally, if the frequency of the slave is varied in exactly the same manner as that of the master, and has a deviation and modulation phase properly related to that of the master when both are heterodyned in mixer 24, the same result will be obtained as in the first instance of fixed frequencies. If the modulation phases and the deviation of the two are not identical at the mixer, then a frequency-modulated signal will result (as changed in unit 30) having little energy of frequency that will pass filter 28. The same result follows whether sine-wave modulation is used or any other modulation of arbitrary waveform is used. The center frequency energy is thus seen to be a maximum for "on course" conditions in this example. Evidently other criteria can be used to establish the identity of the frequency modulation of the two signals. Thus, the very appearance of signal energy in the sidebands, as at one particular frequency, is an indication that there has been a departure from the established course, and a return to course would in the absence of interference reduce the signal energy in such selected side-band to zero. A combination of sharp filters for selecting one or more discrete side-band frequencies that are to be minimized and the center frequency that should be maximized for "on course" indication is entirely feasible and offers certain advantages.

Figure 2:
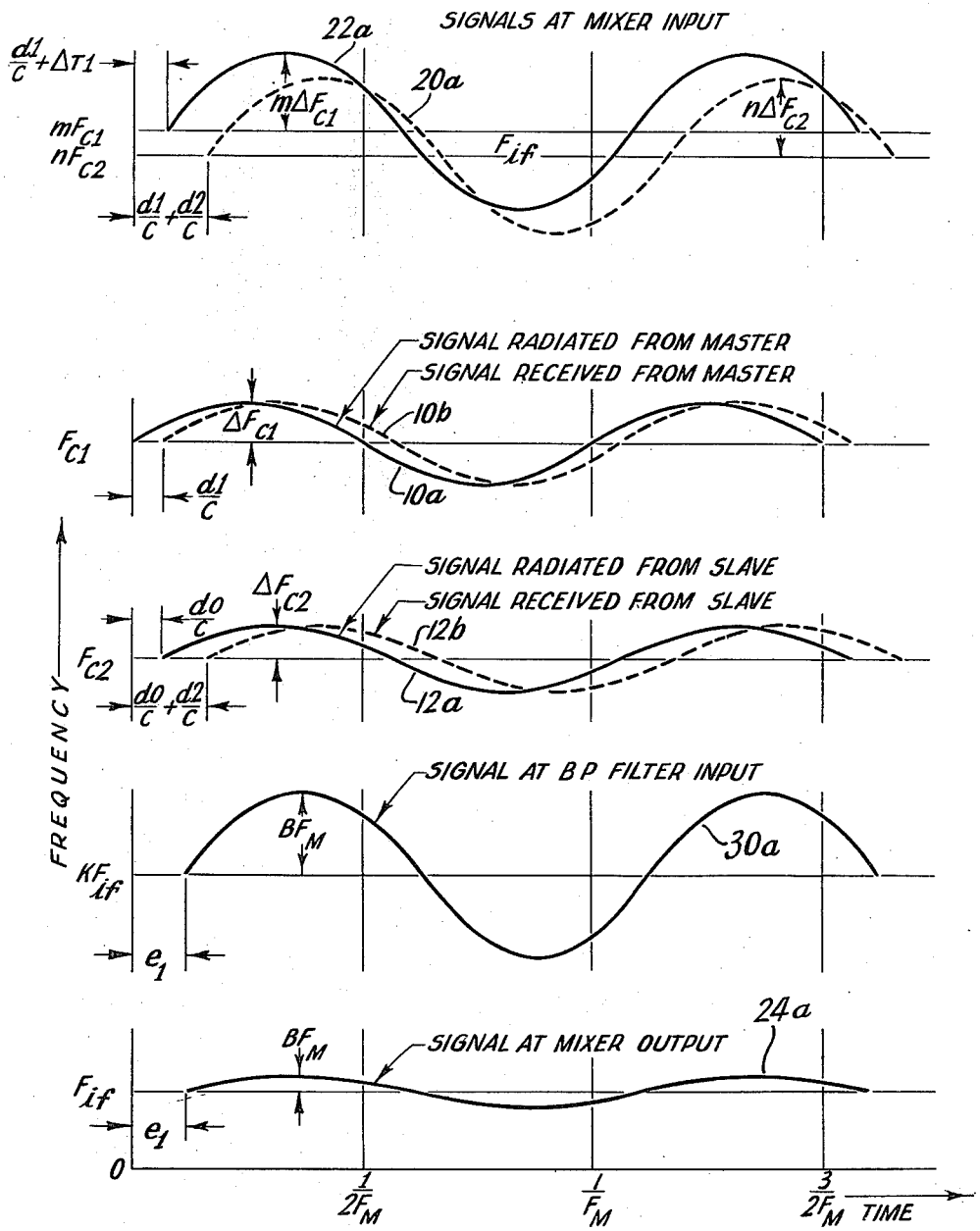

Fig. 2 is an illustration of the signals, their instantaneous relative frequencies, and the relative phases of the sine-wave frequency modulation considered here. The maximum frequency of the master transmitter ($F_{c1}$ plus $\Delta F_{c1}$) is the master carrier frequency $F_{c1}$ that is frequency-modulated through a deviation $\Delta F_{c1}$ with a sine-wave whose frequency is $F_M$. See also Fig. 1. At the slave transmitter whose carrierd frequency is $F_{c2}$ the sine-wave modulation received from the master is utilized in a series of conversions to transmit a signal also having a sine-wave modulation of frequency $F_M$. At an instant when the signal of the master transmitter equals $F_{c1}$ the time may be considered zero and at a time $d_0/c$ later (where $c$ is the velocity of propagation) the frequency-modulated signal reaches the slave station and is again transmitted without further time shift. It is reasonably possible to compensate for the delay $d_0/c$ by means of a delay device in the slave transmitter, but this is more conveniently achieved in the receiver carried by the vehicle where provision is made for course selection by an adjustable delay device.

The signals appearing at various parts of the system are illustrated in further detail in Fig. 2. The second pair of curves 10a and 10b from the top of the figure show the signal radiated from the master transmitter and the signal received from the master after the delay due to the travel of the signal of the distance $d_1$ in Fig. 1. The middle pair of curves 12a and 12b similarly shows the signals radiated from the slave transmitter at a lower carrier frequency, and as received from the slave transmitter after a delay due to distance $d_2$. These received signals from the master and the slave transmitters are separately multiplied in different channels as represented by curves 20a and 22a so that they become a much higher frequency. Moreover, at this point the frequency deviation of the two signals is made by design to be the same. The effect of delay device 32 is not at this point taken into account. Signal 24a represents the output of mixer 24, the difference in frequencies of signals 20a and 22a. By known means (as by ordinary multipliers) represented by unit 30, this can be converted to a signal 30a of larger deviation ratio, as is desirable in some circumstances.

If the location of the receiver is shifted, or if delay device 32 is adjusted properly, signals 10b and 12b can be relatively shifted so that curves 20a and 22a are exactly in phase. Curves 24a and 30a would then be a straight line. To the extent that signal 30a departs from a straight line, the energy of center frequency that will pass filter 28 diminishes, and according to a sharp function even for sine-wave modulation when the departure becomes appreciable.

Figure 3A:
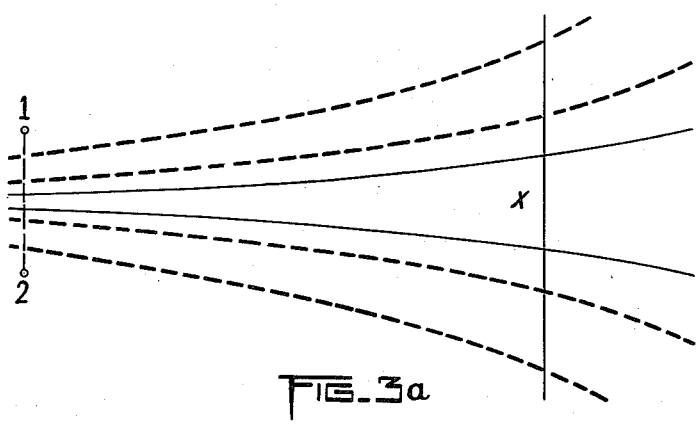
Figure 3B:
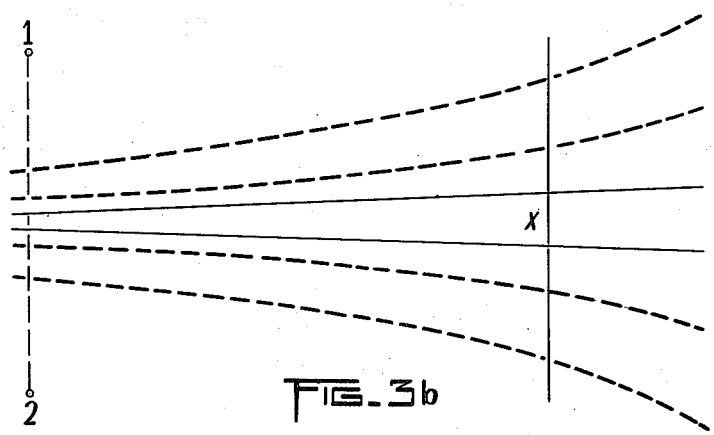
Figure 3C:
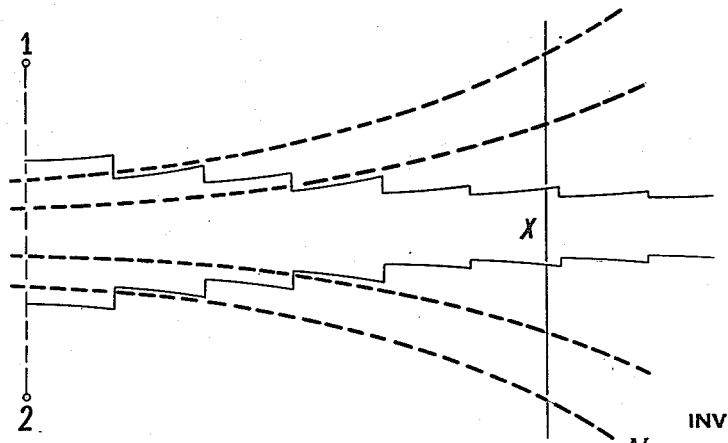

The extent to which the system will give appreciable indication when off of course is of value in returning to the proper course. If the control is broad, Fig. 3a illustrates the broad lane that is etsablished at some considerable distance $x$ from the base line of the transmitters represented by dotted line 1—2. The broadening lane, represented by solid curved lines where first "off-course" response is obtained, can be appreciated by their relative separation at 1—2 and at $x$. If the system is made sharply critical it may be virtually impossible to start a vehicle on course in the region of line 1—2 in Fig. 3b. (In Fig. 3b the vertical scale has been expanded relative to that of Fig. 3a. However, by providing other combinations of units 30 and 28 with known circuit arrangements for progressively modifying the effective deviation ratio of the angle-modulated signal emerging from mixer 24, and means for selecting the proper circuits in succession, broad response can be made progressively more critical (Fig. 3c) by increasing the deviation ratio as the vehicle travels away from line 1—2. This is represented in Fig. 1 by the adjustability of the frequency changer and of the sharp filter. In Figs. 3a, b and c, the curved dotted lines represent the navigation pattern, while the related solid lines represent an exaggerated but comparative representation of the lateral limits of a course, along the perpendicular bisecter of base line 1—2, where reliable "off-course" indication is to be expected.

Noise that inherently has energy components spread over a broad frequency spectrum will have only a limited amount of energy in the narrow acceptance band of filter 28. But it is perhaps more important that the system should not respond to spurious signals inherently produced in its own operation. In a low-frequency application for long-range navigation, the ground wave can be relied upon where line-of-sight sky waves cannot. However, it is to be expected that sky waves traveling a longer path than the ground waves due to reflections, and hence having a different transmission time, will reach the receiver with a signal strength that may be greater than that of the ground wave. Under conditions where strong sky wave signals exist for the both guidance signal transmissions, the embodiment illustrated in Fig. 1 may not be entirely suitable and other embodiments as in Fig. 4 or 5 may be preferred.

The selection, or segregation, and the utilization of the strong center-frequency component of the beat signal of two signals of like waveform of modulation and different mean or carrier frequencies but of equal deviation at the time they are mixed, is an important attribute of this embodiment of the invention. This segregation is effected prior to any rectification or demodulation such as would destroy the distinctions between the center frequency and the sidebands of a heterodyne modulated signal. The signal emerging from the mixer is preserved by linear (if frequency-selective) circuits up to the sharp filter.

Figure 4:
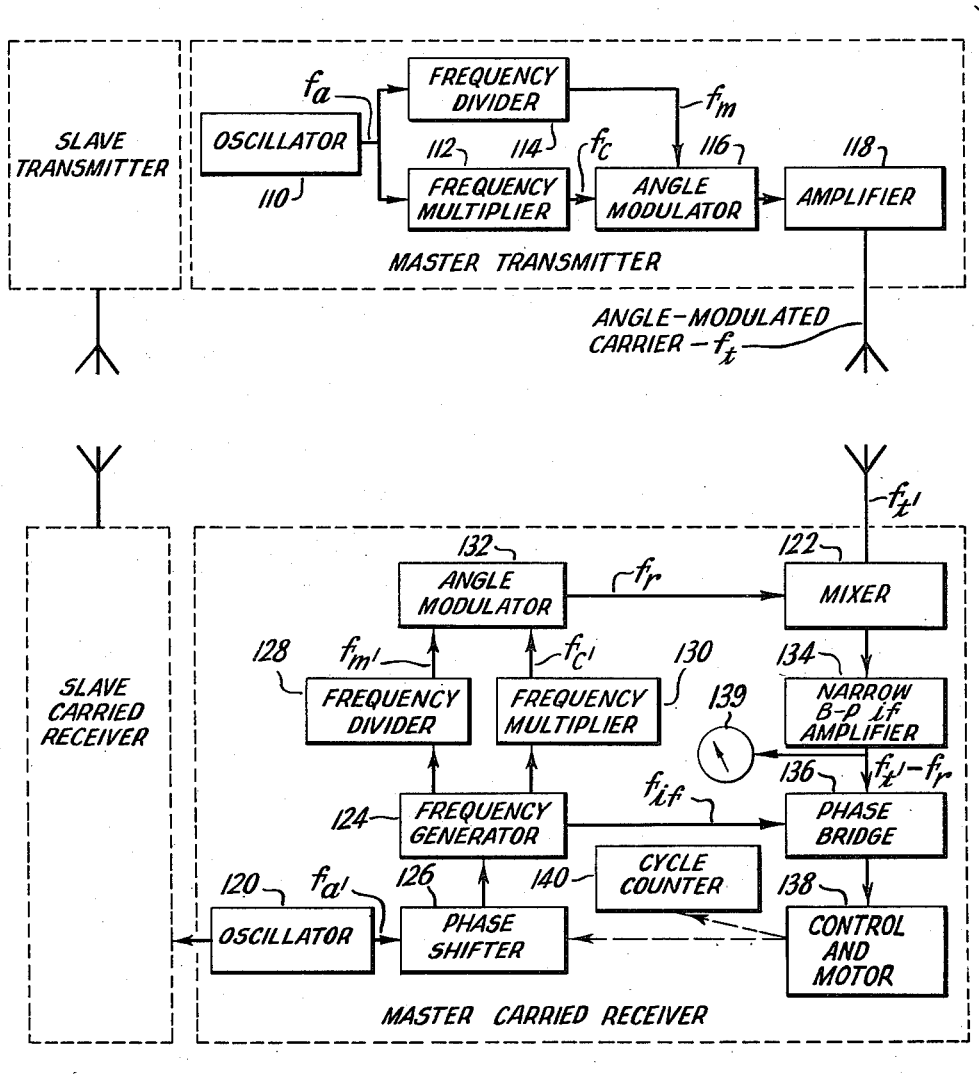
Fig. 4 is a block diagram of another embodiment of the invention.

The segregation of the center-frequency component of a beat-frequency signal is also utilized in the embodiment of Fig. 4. There it is used to provide an indication of range, where a vehicle travels from an initial point to some other point on a circle about a beacon, or of different distance from the beacon. The initial distance from the beacon, incidentally, need not be known for some purposes. In Fig. 4, the stationary transmitter or beacon includes an oscillator 110, desirably of excellent stability, producing a frequency $f_a$, and this frequency is utilized to generate or derive or develop a carrier signal $f_c$ that is transmitted by the master transmitter and a modulation signal $f_m$ that is used to angle-modulate the carrier. Conveniently, but not at all necessarily, the frequency of the oscillator is lower than that of the carrier and higher than that of the modulator, so that a frequency multiplier 112 is used to develop $f_c$ and a frequency divider 114 provides $f_m$, these being combined in unit 116 for providing an angle-modulated carrier. As a specific illustration of such a carrier, but not at all exclusively a requirement of the system, the transmitted signal may be simply a frequency-modulated carrier in which the modulation is a sine wave. The signal produced by modulator 116 will normally require amplification as by unit 118.

The receiver forming part of this system is carried as in an aircraft and, like the beacon, it includes a highly stable oscillator that advantageously is a physical duplicate of oscillator 110 so as best to maintain a frequency of such stability that it may be used as an absolute reference during the travel interval of the aircraft between the calibration point and the points subsequently reached. Thus, if the master receiver is close to the transmitter and the aircraft starts a flight, the reference oscillator as well as the oscillator in the transmitter should be of such stability that they do not drift apart appreciably during the flight.

Reference oscillator 120 in the receiver is utilized to generate a signal having the same deviation as that received and the same form of modulation but of different carrier frequency and it is impresesd upon a mixer 122 where it is heterodyned with the received signal to produce a single pure signal under conditions of perfect match. The locally generated signal is provided by frequency generator 124, that is energized through phase shifter 126, driving frequency divider 128 for providing the sine-wave modulation $f_m'$ and the frequency multiplier 130 for providing the carrier $f_c'$ that differs from the frequency $f_c$ by the output frequency of mixer 122.

By means of angle modulator 132, to which signals $f_c'$ and $f_m'$ are fed, the desired $f_r$ is applied to mixer 122.

The output frequency of the mixer is the difference between the transmitted frequency $f_t'$ and the locally-generated frequency $f_r$, $f_t'$ being a function not only of the frequency of oscillator 110, and the frequencies $f_c$ and $f_m$, but also a function of any changes in the delay introduced by motion of the receiver relative to the transmitter. As the distance increases from zero, should the aircraft depart from the location of the transmitter, it becomes necessary to adjust the instantaneous frequency of the signal $f_r$ if it is to match the received signal $f_t'$. The heterodyne output of mixer 122 is applied to a narrow-band amplifier 134, the output of which is applied to a phase bridge 136. The pass-band of this amplifier should be sufficiently restricted to suppress sideband energy. It will be understood that additional stages of heterodyning may be utilized between mixer 122 and phase bridge 136, the additional local fixed-frequency signals required being derived from frequency generator 124. The signal applied by amplifier 134 to phase bridge 136 as shown is compared with a locally-generated signal $f_{if}$. Any tendency of the output of band-pass amplifier 134 to change in frequency or phase produces an output from phase bridge 136 that is utilized in a motor control unit 138 to adjust phase shifter 126 in that direction necessary to restore the output of phase bridge 136 to a null. The phaser is initially set to maximize output at 139.

Phase bridge 136 is to be responsive exclusively to the relative phases of the applied signals, and is consequently to be designed for immunity to variations in amplitude of the applied signals; but if it is not so designed the applied signals should be limited, in a known manner.

The distance between the receiver and the transmitter can be read directly from the position of phase shifter 126 as set by the motor; or a cycle counter 140, operated by the motor, can be used for this purpose. The phase shifter is operated by the low-speed end of a reduction-gear train while the cycle counter is mechanically connected at a high-speed portion of the gear train.

From the foregoing it will be clear that any any tendency of the signal $f_t'$ to change even slightly from the locally-generated signal $f_r$ will be accompanied by a phase-shift output from unit 136; and this output will so adjust phase shifter 126 that the adjusted phase of the signal $f_{if}$ will restore null output from the bridge; and at the same time the phase of the signals $f_c'$ and $f_m'$ will be shifted through a corresponding angle that may be many times 360° in the case of $f_c'$. The system operates to effect cycle matching between the received signal $f_t'$ and the locally-generated signal $f_r$, and in consequence it is accurate in respect to distance measurements to a fraction of a cycle of the transmitted carrier. With the signals described, the system is relatively immune to noise and other interference because of the highly selective filter between the mixer and the phase bridge, where no demodulation occurs before selection of the desired heterodyne frequency component.

Plural mixers may be incorporated in the receiver, corresponding to mixer 122 except that such additional mixers, between mixer 122 and phase bridge 136, would be supplied with a locally-generated signal of constant frequency like $f_{if}$ from frequency generator 124 rather than a frequency-modulated signal as in the case of $f_r$.

The foregoing ranging system that is primarily useful in radio navigation can be enlarged to provide point location by adding a slave transmitter at a second fixed location, and a carried slave receiver. The slave transmitter may include a separate oscillator like oscillator 110 in the master transmitter or, more desirably, both these transmitters may utilize oscillator 110 for frequency control. The same oscillator 120 in the master receiver can readily be used for the slave receiver.

It has been stated that the ranging accuracy of this system can be within part of a cycle of carrier frequency. This may be demonstrated as follows:

Disregarding the modulation, the signal of frequency $f_t'$ may be represented as:

$$E_1 \cos (2\pi f_t' t)$$

and $f_r$ as:

$$E_2 \cos [2\pi f_r(t-\tau)]$$

Then $f_t' - f_r$ is:

$$E_3 \cos [2\pi(f_t'-f_r)t + 2\pi f_r\tau]$$

$f_{if}$ is:

$$E_4 \cos [2\pi(f_t'-f_r)(t-\tau)]$$

Wherein $E_1$, $E_2$, $E_3$, and $E_4$ are constants representing peak voltage; $t$ is the time variable, $\tau$ is a time displacement, $f_t'$ is the transmitted frequency as received, and $f_r$ is a locally generated carrier frequency in the receiver.

The phase angles in the last two expressions are, for the incoming signal applied to the phase bridge:

$$2\pi f_r\tau$$

and for the locally generated signal applied to the bridge:

$$2\pi(f_t'-f_r)\tau$$

The phase difference, then, is:

$$2\pi f_t'\tau$$

which is measured in cycles of the transmitted carrier frequency.

The modulation is used here, as in the embodiment of Fig. 1, to discriminate against reflected-path signals having different transmission delays than that being utilized, as well as against all other interference. It is also effective in labeling the carrier cycles.

The system of Fig. 4 embodies an extremely important fundamental of radio communication from the viewpoint of noise discrimination. In it, only one of the two signals impressed on the mixer is transmitted over a path in which noise is added to the signal. In the mixer therefore, there is the cross-product of the locally generated signal with the transmitted signal, and with the noise. Where both signals are accompanied by noise into the mixer, as is true where both are transmitted, there is an additional signal-noise cross-product and there is the cross-product of the noise of both signals. By avoiding these last cross-products, the system of Fig. 4 achieves a remarkable degree of noise discrimination. The signals cross-correlated should be in phase for maximum output. The principle involved is the cross-correlation of two signals where one is generated where used and thus is free of noise, in contrast to auto-correlation where a signal in a non-linear stage is multiplied by itself. The integration of the cross-products, ideally accomplished by selecting the carrier frequency component at the beat frequency level, is also an essential function in the cross-correlation process. The beat frequency carrier can be zero. However, where a phase-bridge is used, or where side-band components are utilized as in systems of improved discrimination (described below) a finite beat frequency is necessary. The integration is required to extend over one modulation period of periodic signals. In other applications of the principle, with aperiodic modulation, the integration should be over a time interval sufficiently long to obtain an average of the cross-products.

By maintaining a constant difference between the readings of the cycle counters in the master and slave receivers of Fig. 4 during navigation, an accurate hyperbolic path can be followed even if oscillator 120 were to drift. Differential gearing (not shown) between the counters can be used to advantage for this purpose; and the reading of each counter alone can be retained for indicating range.

Figure 5:
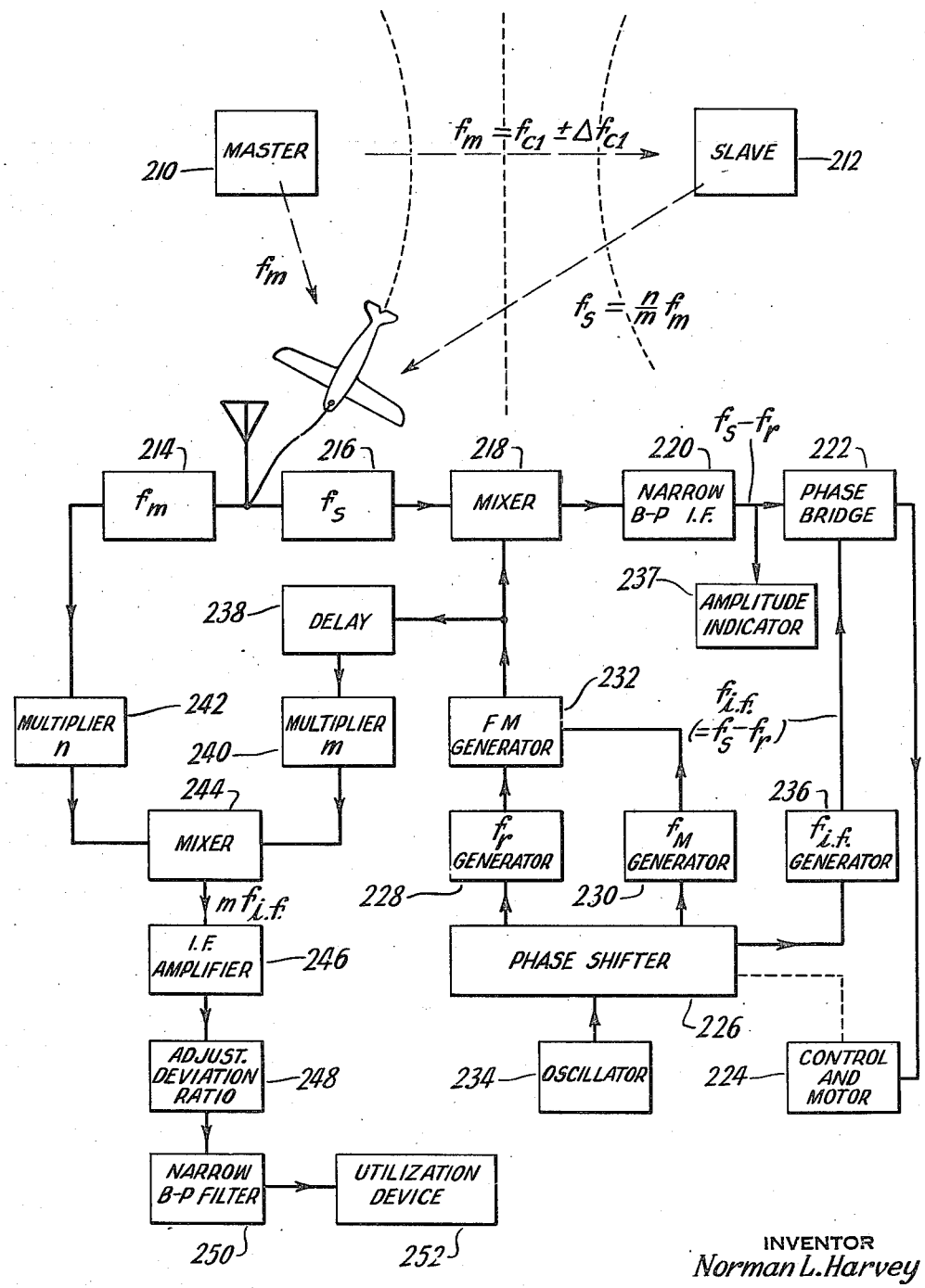
Fig. 5 is a block diagram of a further embodiment of the invention, combining certain features of the systems in Figs. 1 and 4.

A hyperbolic navigation system utilizing the cross-correlation principle, employed in the ranging system of Fig. 4, is shown in Fig. 5. Briefly, the latter involves signals radiated by master and slave transmitters that are spaced apart, advantageously but not necessarily transmitted at different carrier frequencies, but having like modulation of any desired wave form, as sinusoidal. Like-frequency carriers can be distinguished by phase differences, as in separating ground and sky waves.

The receiver that is carried by the aircraft contains a generator for synthetically duplicating or regenerating one of the received signals; and this is compared in a mixer, just as in the embodiment of Fig. 4, with another of the received signals. A portion of the signal generator is locked with the received signal. The regenerated signal consequently is a counter part (although advantageous at a different carrier frequency) of the received signal.

In Fig. 5 master transmitter 210 radiates a frequency-modulated signal both toward the aircraft and toward the slave transmitter 212. The latter transmits a separate signal $f_s$ that has the same form of modulation (if somewhat delayed) and of the same or, preferably different, carrier frequency than the master. In the receiver these are separated by filters 214 and 216, so that one of the frequency-modulated signals, as for example $f_s$, is applied to mixer 218 of the synthetic signal generator or regenerator. A signal $f_r$ is also applied to mixer 218 which is like signal $f_s$ as to frequency deviation and wave form, but of different carrier frequency. Consequently, a signal $f_s - f_r$ emerges from mixer 218 and passes narrow band-pass I. F. amplifier 220, to be impressed upon phase bridge 222. A signal $f_{if}$ which is equal to $f_s - f_r$ is compared in the phase bridge with the I. F. signal, and any phase difference produces an output that exists and energizes motor-and-control unit 224 to operate a phase shifter 226. This has the effect of correcting any time-difference or phase error of the signals produced in unit 228 for generating the carrier component of signal $f_r$ and in unit 230 for generating the modulation component $f_m$ of signal $f_r$, these signals being combined in frequency-modulator 232. The signal impressed upon phase shifter 226 is provided by oscillator 234 of any reasonable stability since drift due to the oscillator as well as other changes in the system tending to disturb the output of FM generator 232 are corrected by the phase bridge and the phase shifter. The signal $f_{if}$ of appropriate phase is also derived from the output of the phase shifter, conveniently converted to the proper frequency by unit 236.

The output of FM generator 232 is free of noise components such as those which accompany the signal $f_s$ that controls the generation of regenerated or synthetic signal $f_r$. Because of the cross-correlation principle, this signal when mixed with $f_m$ from the other control beacon is more immune to noise and other interference than the system of Fig. 1. In particular, this system achieves a high degree of immunity from interference by multi-path reflections which have different delay times than the selected component of the transmission which is, advantageously, the ground wave for most accurate long-range navigation, chosen with unit 237.

The regenerated signal $f_r$ is impressed on delay unit 238 for conversion in multiplier 240 while the signal $f_m$ is similarly converted in frequency by unit 242, the output signals of units 240 and 242 being of like modulation in form and of equal deviation, but of mean frequencies that are different by a pre-determined value. Thus when these signals heterodyne with each other in mixer 244, there will be a signal of constant frequency produced so long as the modulation envelopes are in phase. This output is amplified in unit 246 and is variously multiplied and heterodyned in unit 248 to have the desired deviation ratio determined by conditions discussed in connection with Fig. 3. A particular component of this signal, advantageously the center frequency component, is selected in narrow band-pass filter 250 and the output is applied to utilization device 252.

The operation of units 238 to 252 inclusive is exactly the same as that of units 20 to 32 inclusive in Fig. 1 and will therefore not be reviewed except to say that any departure of the vehicle carrying the equipment described from the course of critical response as established by delay device 238 will result in a shift of the signal energy from the frequency of amplifier 246 into the side bands and a sharp change in the output of filter 250.

Rather than to use units 228, 230 and 232 for the dual purposes of supplying a signal for mixer 218 and for the comparison signal channel including units 238 and 240, an entirely separate signal generator may be provided, similarly energized by oscillator 234 and phase shifter 226.

The foregoing system provides for hyperbolic navigation according to a path selected by the setting of delay device 238. A phase bridge energized by the output of filter 250 and by a like frequency derived through phase shifter 226 can be used to control a motor coupled to delay device 238 for the purpose of indicating "right" or "left" departure from the selected course. The motor or the delay device would be calibrated, and the calibration set at zero when the course is selected, to indicate the degree of departure.

The discrimination against spurious signals of the system in Fig. 4, as well as of portions of Fig. 5 can be improved by using not merely the center-frequency component of the heterodyne signal, but by adding side band components, converted to the frequency of the I. F. carrier. Thus, in Fig. 5 another generator 232' energized as unit 232 can be provided having a carrier frequency differing from that of unit 232 by $2f_M$, and this generator 232' can also feed its signal $f'_r$ into mixer 218. Filter 220 will then yield $f_s - f_r$ and $f_s - (f'_r + 2f_M)$ which are the center-frequency components of $f_s$ and modulated $f_r$ heterodyned, and the second side band of $f_s$ and modulated $f'_r$ heterodyned. Alternatively, the second side band of the heterodyne signal of mixer 218 as shown can be filtered out, heterodyned with $2f_M$ derived from unit 230, and then added to the output of unit 220 for improved discrimination.

Various detailed changes and rearrangement of this embodiment and of other embodiments of the invention will occur to those skilled in the art. Certain broader features of the invention will be found equally workable with other types of modulation such as amplitude modulation or pulse modulation; and similarly, other radio location systems can be adapted to use broad features of the invention. In consequence, it is appropriate that the appended claims be accorded that latitude of interpretation that is consistent with the spirit and scope of the invention.

What I claim is:

1. A radio navigation system including a master transmitter at a first location having angle-modulating means, a slave transmitter at a second location separated from the first by a substantial distance and having means for angle-modulating the carrier of the slave transmitter with like wave form as that of the master transmitter and fixed in phase relation thereto, and a receiver at a third location having means for receiving the angle-modulated signals from said transmitters, means for heterodyning said signals, a channel of linear response characteristics energized by the output of said heterodyning means and including a narrow bandpass filter, and a utilization device responsive to the output of said filter.

2. A radio navigation system, including a first transmitter at a first location adapted to broadcast an angle-modulated signal at a first carrier frequency, a second transmitter at a second location substantially separated from the first transmitter and adapted to transmit an angle-modulated signal of the same form of modulation and fixed in phase relative thereto, a receiver having separate channels for each of the transmitted angle-modulated signals, means for mixing the output of said channels, a narrow filter energized by the heterodyne output of said mixer, and a utilization device connected to said filter.

3. A radio navigation system including a master transmitter at a first location adapted to broadcast an angle-modulated signal at a first carrier frequency, a slave transmitter at a second location substantially separated from the master transmitter and adapted to transmit an angle-modulated signal of different carrier frequency but of the same form of modulation and fixed in phase in relation to the modulation of the master transmitter, a receiver having separate input channels for each of the transmitted angle-modulated signals, one of said channels including a delay device for establishing a desired phase relationship between the transmitted signals as received after transmission delays, means for mixing the output of said channels, a sharp bandpass filter energized by the heterodyne output of said mixer, and a utilization device connected to said filter.

4. A radio navigation system including a master transmitter, a slave transmitter, and a receiver having separate input channels for receiving signals from the respective transmitters separately, said transmitter including a carrier frequency generator and frequency modulating means, said slave transmitter including means for receiving the modulated carrier of said master transmitter and frequency converting means to change the carrier frequency of the received signal by a factor of $n/m$ in which $n$ and $m$ are any numbers and to introduce an additional fixed carrier frequency difference, the input channels of said receiver including frequency multipliers having the ratio in the master transmitter channel to the slave transmitter channel of $m/n$, said receiver also including a mixer energized by said input channels, and a mixer output circuit having a high Q circuit tuned to derive and separate the center frequency component of the mixer output.

5. A radio ranging system including a transmitter having a highly stable oscillator, means controlled by the oscillator for generating carrier and modulating signals, and a modulator for combining the generated signals into an angle-modulated transmitter signal, and a mobile receiver having a second highly stable oscillator virtually the duplicate of the transmitter oscillator, means controlled by the oscillator for generating a modulating signal of virtually the same form and frequency as that of the transmitter, means controlled by the oscillator for generating a further signal of a carrier frequency differing from that of the transmitter, and means including a modulator for combining the receiver generated signals into a locally generated angle-modulated receiver signal, means in the receiver for heterodyning the receiver signal and the received transmitter signal, a narrow bandpass filter for deriving the center-frequency component of the heterodyne signal, means for generating an intermediate frequency signal from the oscillator signal equal in frequency to said center-frequency component, a phase bridge connected to compare said center-frequency component and said generated intermediate frequency signal, a continuous phase shifter between said receiver oscillator and all said receiver signal generating means, a motor controlled by said phase bridge for adjusting said phase shifter to maintain identity of phase between the signals applied to the phase bridge despite changes in transmission delay attributable to changes of range, and means to integrate the changes of phase corrected by said motor and phase shifter, to measure change of distance between said transmitter and said receiver.

6. A radio system including means for providing plural angle-modulated signals having like wave forms of modulation, means for transmitting said signals via two paths including a receiver having separate channels for said signals and having heterodyne means for combining said signals, a narrow bandpass filter in the output of said heterodyne combining means, a delay device controlling one of said signals, and means for automatically adjusting the delay device under control of the output of said filter.

7. A radio system including two channels for generating, transmitting and receiving angle-modulated signals of like modulation wave form, one of said channels including an adjustable phaser, heterodyne means for combining said signals, a narrow bandpass filter energized by the output of said combining means, and means responsive to said filter for continuously adjusting said phaser and for integrating the adjustment.

8. A method of radio location including the steps of producing two signals of different carrier frequencies but of identical modulation in type and form, heterodyning said signals at a receiving point, and selecting and utilizing a discrete frequency component of the heterodyne product.

9. A method of radio location including the steps of producing two signals of different carrier frequencies but of identical modulation in type and form, controlling the effective transmission time of one of said signals, heterodyning said signals at a receiving point, and selecting and utilizing a discrete frequency component of the heterodyne product.

10. A method of radio location including the steps of producing two periodic signals of the same type and wave form of modulation but of different carrier frequencies, transmitting said signals via two paths, heterodyning said signals after transmission, selecting the center-frequency component of the heterodyne product, and adjusting the transmission timing of one of said signals to maximize the center-frequency component.

11. A radio navigation system including a pair of mutually spaced signal sources having means producing angle-modulated signals having a predetermined form and phase relationship of modulation but of different carrier frequencies, a receiver having heterodyning means for cross-modulating said signals, a narrow bandpass filter energized by the heterodyne output of said mixer for extracting at least discrete frequency components of the cross-modulation components of said cross-modulated signals, and a utilization device energized by the output of said filter.

12. A radio navigation system including a pair of mutually spaced sources of angle-modulated signals having like form of modulation and established modulation phase relationship, a receiver having mixer means for combining said signals and yielding a heterodyne output signal, means for converting said heterodyne output signal to change its deviation, and a narrow bandpass filter energized by the converted heterodyne output for separating a certain frequency component therefrom.

13. A radio navigation system including a pair of mutually spaced sources of angle-modulated signals having like wave forms and established modulation phase relationship, and a receiver including a mixer for combining said signals, an adjustable frequency multiplier energized by said mixer for converting the heterodyne output of the mixer to a signal of adjustable deviation, and a narrow bandpass filter whose response frequency is adjustable to select a predetermined component of the multiplied heterodyne signal, the adjustability of said frequency multiplier and said filter being effective to establish at will broad or sharp response of the receiver to the angle-modulated signals from said sources.

14. The method of radio location comprising the steps of transmitting a first modulated signal to a receiver, generating a second signal of identical type and form of modulation, heterodyning said signals together and selecting and utilizing a discrete component of the heterodyne product.

15. The method of radio location comprising the steps of transmitting a first modulated carrier, providing a second signal of like modulation in type and wave form as that of the first transmitted signal but of a different carrier frequency, heterodyning said signals and selecting the center-frequency component of the heterodyne product.

16. The method of radio location in accordance with claim 15 including the step of adjusting the phase of the second signal to yield a maximum of the selected signal energy.

17. The method of radio location comprising the steps of deriving a first modulated carrier from a single signal source so that the modulation and the carrier are related in phase and frequency, transmitting said signal, deriving a second modulated carrier from a second frequency source so that the carrier and modulation thereof will have a predetermined relationship in phase and frequency and so that the modulation of the second modulated carrier is the duplicate of the modulation of the first modulated carrier, heterodyning the first and second signals at a receiving point, selecting a certain frequency component of the heterodyne output, deriving a signal from the second source of a frequency equal to the selected component, comparing the phase of the selected component and the derived signal, adjusting the relative phases of the second carrier together with its modulation, and the additional derived signal, in relation to the first carrier as received, to eliminate any phase diffrence between the selected component and the derived signal.

18. The method of radio location comprising the steps of deriving the carrier and modulation components of a first modulated carrier from a common signal source so that the modulation and the carrier have a definite phase and frequency relationship, deriving a second modulated carrier having a definite relationship between its modulation and its carrier, the modulation of the second carrier being a duplicate of that of the first modulated carrier, transmitting the first and second modulated carriers over different paths to a receiving point, deriving a third modulated carrier having a duplicate modulation wave form as that of the first and second modulated carriers and related in phase and frequency to its carrier, synchronizing the second signal with the third to constitute of the third signal a regenerated counterpart of the second signal as received after a transmission delay, and comparing the first signal with the regenerated signal, heterodyning the first modulated carrier as received with the regenerated signal, selecting a particular component of the heterodyne output, and adjusting the relative phase of the regenerated counterpart signal and the first modulated signal as received after transmission delay to maximize the selected component.

19. The method of radio location comprising the steps of deriving the carrier and modulation components of a first modulated carrier from a common signal source so that the modulation and the carrier have a definite phase and frequency relationship, deriving a second modulated carrier having a definite relationship between its modulation and its carrier, the modulation of the second carrier being a duplicate of that of the first modulated carrier, transmitting the first and second modulated carriers over different paths to a receiving point, deriving a third modulated carrier having a duplicate modulation wave form as that of the first and second modulated carriers and related in phase and frequency to its carrier, synchronizing the second signal with the third to constitute of the third signal a regenerated counterpart of the second signal as received after a transmission delay, heterodyning the first modulated carrier as received with the regenerated signal, selecting a particular component of the heterodyne output, and adjusting the relative phase of the regenerated counterpart signal and the first modulated signal as received after transmission delay to maximize the selected component.

20. The method of radio location according to claim 19 wherein the first, second, and third modulated carriers are of the angle-modulated type.

21. The method of radio location in accordance with claim 19 wherein the carrier frequency of the first and second modulated carriers are different from each other, and the carrier frequency of the second and third modulated carriers are different from each other, and in which all three modulated carriers are of like modulation wave form.

22. The method of radio location in accordance with claim 21 in which the second modulated carrier is derived from the first modulated carrier.

23. The method of regenerating a modulated signal that may be accompanied after transmission by various types of interference, which comprises the steps of generating a duplicate signal at the receiving point, heterodyning said signals, selecting a particular component of the heterodyne signal, locally deriving a signal of the same frequency as that selected, and adjusting the phase of the generated signal and the additional comparison signal to eliminate any phase difference between the signals.

24. Receiving apparatus in a radio location system including means to receive a modulated carrier having predetermined relationship between its modulation and its carrier, a local oscillator, means energized by said oscillator to generate a local carrier, a modulation signal, and a further signal, a phase shifter between said generating means and said oscillator, a modulator combining the local carrier and the modulation signal, a mixer for heterodyning the received signal and the locally modulated carrier, means for selecting a component in the heterodyne output the frequency of which equals that of said further generated signal, means for comparing the phase of the selected component and said further generated signal, and means energized by said comparing means for continuously adjusting said phase shifter to minimize the phase difference.

25. A radio navigation system including a transmitter having a highly stable oscillator and means for deriving from the oscillator an angle-modulated transmitter signal, and a mobile receiver, said receiver having a highly stable oscillator that is virtually a duplicate of the transmitter oscillator, means controlled by the receiver oscillator for locally generating an angle-modulated signal of the same modulation form as that of the transmitter, comparing means including a heterodyne mixer, a sharp filter, and a phase bridge for indicating any change in phase between the carrier of the received transmitter signal and of the locally generated signal, and a motor-operated phase shifter controlled by said phase bridge between said receiver oscillator and said generating means.

26. The method of radio navigation including the steps of generating a first angle-modulated carrier at a fixed location, receiving said angle-modulated carrier at another position after transmission through a distance in which the signal incurs a delay, generating a second angle-modulated signal at the other position of identical modulation form as that transmitted, comparing the locally generated and the received signals, and continuously adjusting the locally generated signal to assure phase tracking of the carriers.

27. A navigation system including a master transmitter and a slave transmitter at mutually separated locations, means in each transmitter for generating an angle-modulated signal of fixed phase and frequency of modulation, said master and slave transmitters including at least one highly stable oscillator from which the transmitted signals are derived, a receiver including at least one stable oscillator virtually duplicating said transmitter oscillator, two receiver channels for separately receiving the master transmitter signal and the slave transmitter signal, each of said channels including a local generator energized by said oscillator for producing an angle-modulated signal of like wave form to that of the transmitters, means including a phase bridge for comparing the respective received signals with the respective locally generated signals, a continuous phase shifter between each oscillator and each local generator, and motor means controlled by each phase bridge to adjust the phase shifter and maintain identity of phase between the received signal and the locally generated signal.

28. A radio navigation system in accordance with the preceding claim wherein the mean frequencies of the locally generated signals differ from the master and slave signals by a fixed amount, and in which each comparing means includes a mixer and a narrow bandpass filter tuned to separate the respective center-frequency components of the difference-frequency signals produced by the mixers.

29. A radio navigation system including master and slave transmitters, said master transmitter having a highly stable local oscillator and means for deriving therefrom a highly stable angle-modulated transmitted signal, means in said slave transmitter for receiving the signal from said master transmitter after a delay and for retransmitting the angle-modulated signal at a different center-frequency, a mobile receiver having separate channels for receiving the signals from the master and slave transmitters respectively, a highly stable oscillator in the receiver that is virtually a duplicate of that in the master transmitter, means including a phase shifter for generating an angle-modulated signal of like form and phase of modulation as that received in one of the receiver channels, means for combining the signal of said one channel with the locally generated signal, means including a phase bridge for indicating relative change between the received signal of said one channel and the locally generated channel, a motor in control relation to said phase shifter and energized by said phase shifter for maintaining identity between the phase of the locally generated signal and the received signal, means including a delay device for combining the signal received in the other of said channels with the locally generally angle-modulated signal, and an output channel from said mixer including a narrow bandpass filter for selecting the center-frequency component of the difference-frequency signal produced by mixing the locally generated and the other received signal, and a utilization device energized by the signal from said narrow bandpass filter.

30. A radio navigation system including a first carrier transmitter, a receiver, a second carrier source in said receiver, a heterodyne frequency source having a fixed multiple-phase relationship to said second carrier, means for heterodyning said carriers, means for comparing the phase of the heterodyne frequency and the corresponding output-frequency component of said heterodyning means, and means for adjusting the second carrier source and the heterodyne frequency source to maintain a predetermined phase relationship of the heterodyne frequency and the corresponding heterodyne output.

31. A radio navigation system including a first carrier transmitter, a receiver, a second carrier source associated with said receiver, the carriers having a certain frequency difference, means locked to the second carrier source for deriving a signal of that frequency difference, means for heterodyning said carriers together, a phase bridge energized by said difference-frequency deriving means and said heterodyning means, and a phaser for adjusting both said second carrier source and said difference-frequency deriving means and controlled by said phase bridge for minimizing phase difference between the output of said heterodyning means and the difference-frequency signal and thereby correspondingly maintaining the carriers in fixed time relationship.

32. A radio ranging system including a first carrier transmitter, a vehicle-carried receiver, a second carrier source within said receiver, the carriers having a certain frequency difference, means locked to the second carrier source for deriving a signal of that frequency difference, means for heterodyning said carriers together, a phase bridge energized by said difference-frequency deriving means and said heterodyning means, a phaser for adjusting both said second carrier source and said difference-frequency deriving means and controlled by said phase bridge for minimizing phase difference between the output of said heterodyne output signal and the difference-frequency signal and thereby correspondingly maintaining the carriers in fixed time relationship, and means for integrating the adjustments of said phaser for ascertaining changes in distance between said transmitter and said receiver.

33. Apparatus in accordance with claim 31 wherein like angle-modulating means is included in both carrier sources definitely related to the carrier in timing, and in which said heterodyning means includes a narrow bandpass filter for selecting the center-frequency component of the heterodyne output signal, and amplitude indicating means for enabling adjustment of said phaser to maximize the center-frequency component.

34. A method of radio navigation including the steps of deriving a first angle-modulated carrier in which the modulation and the carrier have a predetermined time relationship, providing a second angle-modulated carrier having a duplicate form of modulation to that of the first modulated carrier and having the same predetermined time relationship of its modulation and carrier but of different carrier frequency, heterodyning said signals to yield a heterodyne output, initially adjusting the relative timing of said carriers to maximize the center-frequency component of said heterodyne output, and continuously adjusting that relative timing to maintain a predetermined phase relationship between said carriers despite possible interfering carriers of equal frequency but of different phase.

35. Methods of radio location including the step of cross-correlating a transmitted signal that may be accompanied by interference, with a signal like the transmitted signal in type and form of modulation provided at the receiving point.

36. Methods of radio location including the steps of transmitting and receiving a first periodically modulated signal, providing a like signal in type and form of modulation at the receiving point, cross-multiplying said signals together, and integrating the cross-product over a modulation period.

37. Methods of radio location including the steps of transmitting and receiving a first modulated signal, providing a like signal in type and form of modulation at the receiving point, cross-multiplying said signals together, and integrating the cross-product over a period of time sufficiently long to establish its average value.

38. Methods of radio location including the steps of transmitting and receiving a first periodically modulated signal, providing a like signal in type and form of modulation at the receiving point, cross-multiplying said signals together, and integrating the cross-product over a modulation period, and adjusting the relative timing of the signals before cross-multiplying them to maximize the integrated product.

39. Methods of radio location including the steps of transmitting and receiving a first modulated signal, providing a like signal in type and form of modulation at the receiving point, cross-multiplying said signals together, and integrating the cross-product over a period of time sufficiently long to establish its average value, and adjusting the relative timing of the signals before cross-multiplying them to maximize the integrated product.

40. The method of radio location including the steps of cross-correlating a transmitted signal that may be accompanied by interference with a signal provided at the comparison point having the same spectrum as that of the transmitted signal alone.

References Cited in the file of this patent

UNITED STATES PATENTS

| Number | Name | Date |
|---|---|---|
| Re. 23,050 | Brunner | Nov. 23, 1948 |
| 1,495,616 | Simpson | May 27, 1924 |
| 1,562,485 | Affel | Nov. 24, 1925 |
| 1,976,877 | De Bellescize | Oct. 16, 1934 |
| 1,995,285 | Albersheim et al. | Mar. 26, 1935 |
| 2,041,855 | Ohl | May 26, 1936 |
| 2,198,113 | Holmes | Apr. 23, 1940 |
| 2,413,694 | Dingley | Jan. 7, 1947 |
| 2,449,174 | O'Brien | Sept. 14, 1948 |
| 2,497,513 | Paine et al. | Feb. 14, 1950 |